United States Patent [19]
Ogasawara

[11] Patent Number: 5,212,515
[45] Date of Patent: May 18, 1993

[54] AUTO-FOCUSING APPARATUS
[75] Inventor: Akira Ogasawara, Kawasaki, Japan
[73] Assignee: Nikon Corporation, Tokyo, Japan
[21] Appl. No.: 813,515
[22] Filed: Dec. 26, 1991
[30] Foreign Application Priority Data
  Jan. 16, 1991 [JP] Japan .................................. 3-14998
[51] Int. Cl.$^5$ ............................................ G03B 13/36
[52] U.S. Cl. ................................... 354/402; 354/429
[58] Field of Search ............... 354/402, 403, 406, 407, 354/408, 429; 358/227

[56] References Cited
U.S. PATENT DOCUMENTS
  4,903,135  2/1990  Ohtake et al. ........................ 354/402
  5,008,695  4/1991  Nagaoka et al. ..................... 354/403
  5,153,630  10/1992 Ogasawara .......................... 354/402

Primary Examiner—Russell E. Adams
Attorney, Agent, or Firm—Shapiro and Shapiro

[57] ABSTRACT

An auto-focusing apparatus adjusts focus of a photographing lens based on the focus detection in accordance with object image signals in an overflow of a portion of the signals is within a permissible level so that a delay time in the lens drive is shortened and the operability is improved.

The auto-focusing apparatus comprises a focus detection optical system, photo-electric conversion means having a plurality of photo-sensing elements, focus detection means for calculating a defocusing amount in accordance with the object image signals from the photo-electric conversion means, drive means for driving a photographing optical system, averaging means for calculating a mean value of the object image signals of at least a portion of the photo sensing elements, and control means for calculating the defocusing amount by the focus detection means in accordance with the object image signal when the mean value calculated by the averaging means is smaller than a predetermined value even if a portion of the object image signals of the photosensing elements exceeds a proper input level of the focus detection means and driving the photographing optical system by the drive means in accordance with the calculated defocusing amount.

2 Claims, 6 Drawing Sheets

OBJECT IMAGE SIGNANL OF
PHOTO-ELECTRIC CONVERTER
(LIGHT RECEIVING SENSOR)

FIG. 7

OBJECT IMAGE SIGNAL OF
PHOTO-ELECTRIC CONVERTER
(LIGHT RECEIVING SENSOR)

AUTO-FOCUSING APPARATUS

BACKGROUND OF THE INVENTION

1. Field of the Invention

The present invention relates to an autofocusing apparatus which detects focus by a charge storage type photo-electric converter such as a CCD and drives a photographing lens into an in-focus position.

2. Related Background Art

An auto-focusing apparatus which directs a portion of a light beam from an object and transmitted through a lens to a charge storage type photo-electric converter having a plurality of photo-sensing elements such as a CCD, detects focus in accordance with an output signal of the photo-electric converter which represents a light intensity distribution of an object image, and drives a photographing lens into an in-focus position in accordance with the result of the focus detection, has been known.

In such an apparatus, an object image signal produced by the photo-electric converter is amplified to an appropriate signal level by an amplifier, it is A/D converted and it is supplied to a microcomputer which processes it for detecting the focus. It is desired that the object image signal used for the focus detection has a certain signal level in order to secure a focus detection precision. However, when a light intensity of the object is not constant but it significantly changes or a photographer selects another object, the light intensity of the object may significantly change by a factor of several thousands to ten thousands. Accordingly, the charge storage time of the photo-electric converter, a stored charge-voltage conversion gain of the photo-electric converter itself and a gain of a succeeding stage amplifier are adjusted in accordance with the change of the light intensity to transfer a predetermined level of object image signal to the microcomputer.

Figure 5:
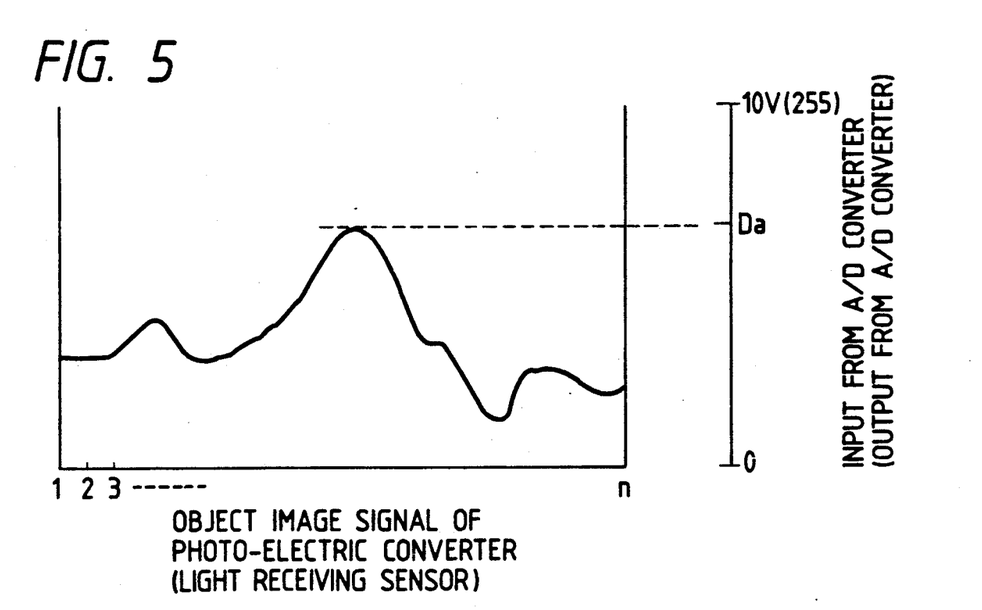
FIG. 5 shows an object image signal waveform in which a maximum level of data is at a target signal level.

FIG. 5 shows an output voltage of a photosensing element (1~n) amplified to an appropriate signal level, that is, an input voltage to the A/D converter. A target input voltage Da is so set that an input voltage may not exceed the rated input voltage of 10V for a normal variation of the object image signal and that a reduction of an S/N ratio due to a noise may not be caused. For example, when the A/D converter has a rated input voltage of 10V and an 8-bit output (0–255), the target input voltage Da is set to 7V.

Figure 6:
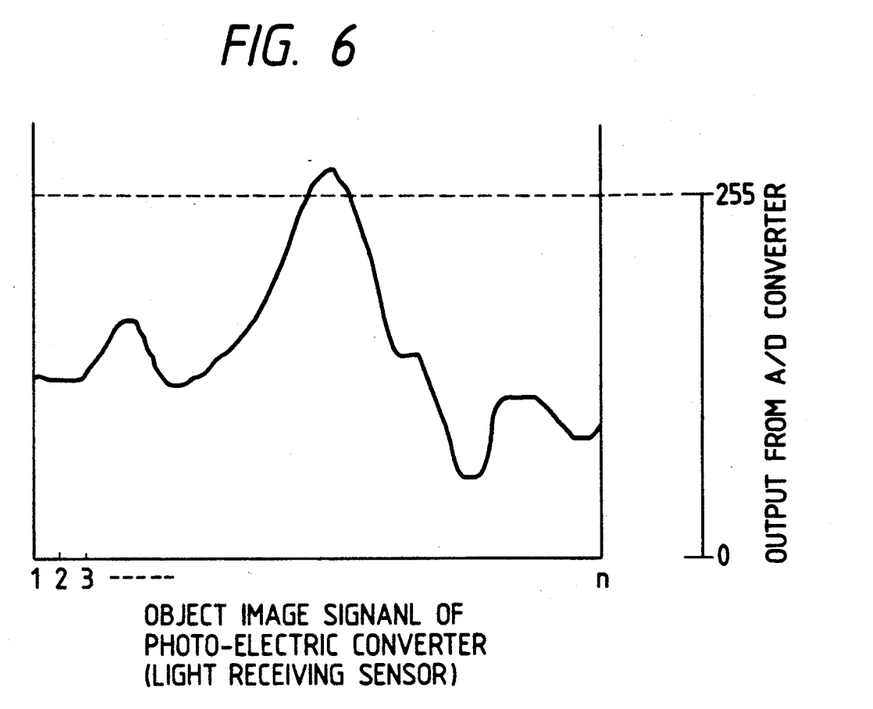
FIG. 6 shows an object image signal waveform in which a portion of data overflows.

However, when the change of the light intensity of the object is so abrupt that the adjustment of the signal level cannot follow, a portion of the object image signal may exceed the rated input voltage of 10V of the A/D converter as shown in FIG. 6. In this case, an output for the object image signal which overflows the input range of the A/D converter is 255. If the focus detection is done in accordance with such an object image signal, the focus detection precision decreases so that the photographing lens may not be driven to the in-focus position. Thus, in the prior art apparatus, if a portion of the object image signal overflows, the focus detection based on the object image signal and the focus adjustment of the photographing lens based on the focus detection are inhibited, and the charge storage time and the amplifier again are adjusted and the charge storage of the photo-electric converter is started again to bring the object image signal level at the next storage to the target level. As a result, the object image signal having a proper level as shown in FIG. 5 is produced and a defocus amount is calculated by a predetermined algorithm in accordance with the object image signal, and the photographing lens is driven in accordance with the defocusing amount.

There is no much difference between the defocusing amounts calculated by the focus detection in accordance with the object image signal a portion of which overflows the input range of the A/D converter as shown in FIG. 6 and by the focus detection in accordance with the object image signal having the target level derived from the same object by adjusting the charge storage time and the amplifier gain as shown in FIG. 5.

However, in the prior art auto-focusing apparatus, when a portion of the object image signal overflows, the focus detection based on such data and the focus adjustment of the photographing lens based on the focus detection are inhibited and the charge storage time and the amplifier gain are adjusted to resume the charge storage. As a result, the photographing lens is not driven until the next object image signal is produced by the photo-electric converter, and the delay time when the lens is driven increases and the operability is deteriorated.

SUMMARY OF THE INVENTION

It is an object of the present invention to provide an auto-focusing apparatus having a high operability which performs a focus detection operation in accordance with an object image signal and focus adjustment of a photographing lens based on the focus detection if an overflow of a portion of the object image signal is in a permissible level so that a delay time when the lens is driven is shortened.

The auto focusing apparatus of the present invention comprises photo-electric conversion means having a plurality of photo-sensing elements for sensing a light beam from an object directed through a focus detection optical system to produce object image signals representing light intensities of the photo-sensing elements; focus detection means for calculating a defocusing amount representing a focus adjustment status of a photographing optical system in accordance with the object image signals; drive means for driving the photographing optical system in accordance with the defocusing amount; control means for calculating the defocusing amount by the focus detection means in accordance with the object image signals when the object image signals of the photo-sensing elements are at a proper input level of the focus detection means to assure correct focus detection and driving said photographing optical system by the drive means in accordance with the calculated defocusing amount; and averaging means for calculating a mean value of the object image signals of at least a portion of the photo-sensitive elements. The control means calculates the defocusing amount by the focus detection means in accordance with the object image signals when the mean value calculated by the averaging means is smaller than a predetermined value even if a portion of the object image signals of the photo-sensing elements exceeds the proper input level of the focus detection means and driving said photographing optical system by the drive means in accordance with the calculated defocusing amount.

In accordance with the present invention, even if a portion of the object image signals of the photo-sensing elements exceeds a proper input level of focus detection means, the focus detection means calculates a defocusing amount based on the object image signal if a mean value calculated by averaging means is smaller than a predetermined level and the drive means drives the photographing optical system based on the calculated defocusing amount.

DETAILED DESCRIPTION OF THE PREFERRED EMBODIMENTS

Figure 1:
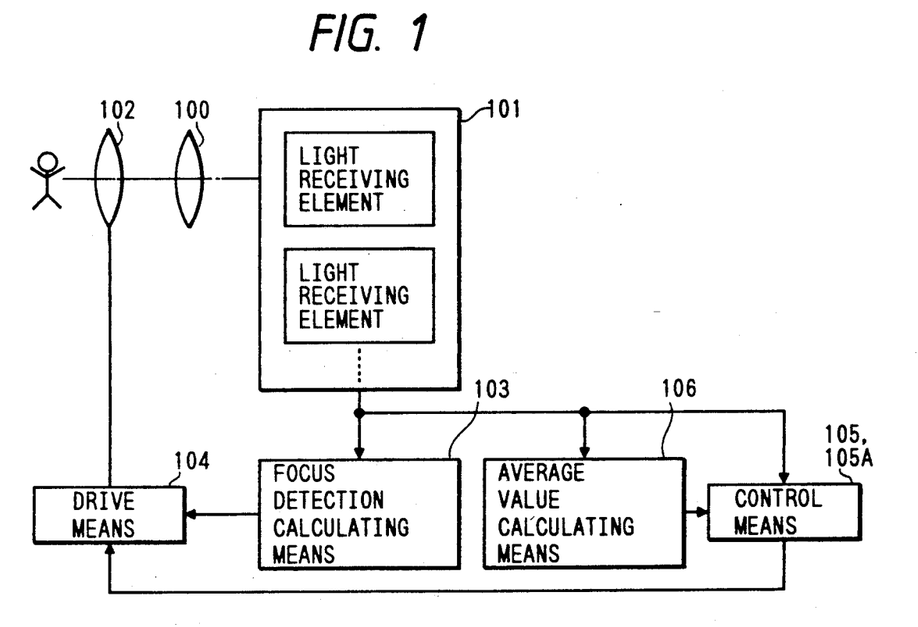
FIG. 1 shows a configuration of an embodiment of the present invention.
Figure 2:
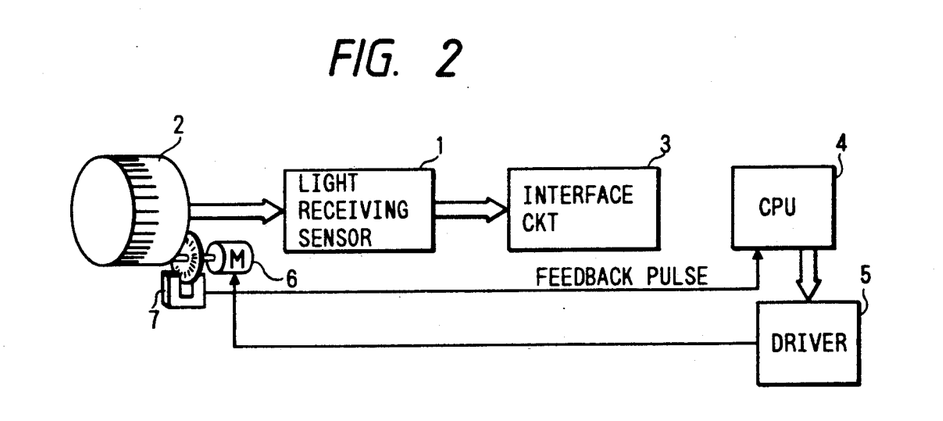
FIG. 2 shows a block diagram of an embodiment of the present invention.

FIG. 2 shows a block diagram of one embodiment.

Numeral 1 denotes a charge storage type photosensor which has n photo-diode cells such as CCD's. A portion of a light beam from an object transmitted through a photographing lens 2 is directed to the photo-sensor 1 by a focus detection optical system (not shown) so that an object image is focused on the photo-sensor 1. The photo-sensor 1 starts a charge in accordance with light intensities of small areas of the object image by the photo-diode cells, and converts it to an electrical signal to produce an object image signal. Numeral 3 denotes an interface circuit which amplifies the object image signal from the photo-sensor 1 to a predetermined level, A/D converts it and supplies it to a controller (CPU) 4.

The CPU 4 comprises a microcomputer and peripheral components, and performs the focus detection operation in accordance with the object image signal from the interface circuit 3 to calculate a defocusing amount and determines a lens drive amount in accordance with the defocusing amount, and supplies it to a driver 5. The driver 5 drives a lens drive motor 6 in accordance with the lens drive amount to drive the photographing lens 1 to an in-focus position. Numeral 7 denotes a pulse generator such as a photo-interrupter mounted on a rotation shaft of the lens drive motor 6. It generates a pulse for each predetermined length of movement of the photographing lens 2 along an optical axis and supplies it to the CPU 4.

Figure 3:
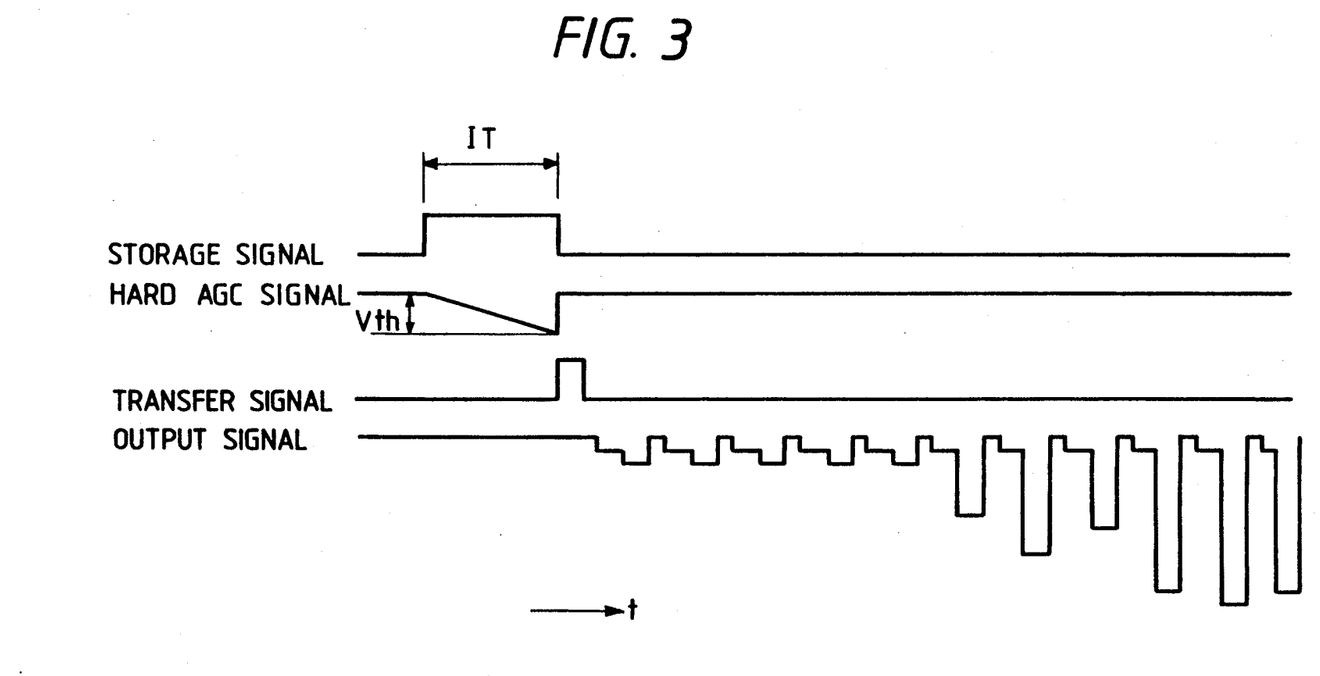
FIG. 3 shows a time chart of input/output signals of a photo-sensor.

FIG. 3 shows a time chart of input/output signal of the photo-sensor 1. When a light is directed from the object to the n photo-diode cells of the photo-sensor 1, the photo-diode cells generate photons. Since the amount of photons is proportional to a light intensity of a small area of the object image, a signal output level of the photo-sensor 1 reaches an appropriate level if the photons are stored for an appropriate time determined by the light intensity of the object. However, the light intensity of the object significantly varies from object to object as described above. Accordingly, the circuit is designed to switch a charge-voltage conversion gain of the photo-sensor 1 and an amplification gain of an amplifier of the interface 3 in accordance with the light intensity of the object so that the storage time IT does not significantly change.

A method for controlling the output signal level of the photo-sensor 1 by controlling the storage time IT includes a soft AGC method and a hard AGC method. In the former, next storage time is predicted based on a previous output level of the photo-sensor 1, and it is set in a storage time timer to control the storage time. In the latter, a charge storage status of the photo-sensor 1 is monitored by a monitoring photo-sensing element provided on the photo-sensor 1 and the storage is terminated when an appropriate level is reached.

The monitoring photo-sensing element of the hard AGC monitors an average stored charge amount of substantially entire area or a portion adjacent to a center of a photo-sensing area of the photo-sensor 1 to detect when the stored charge amount of the photo-sensor 1 reaches an appropriate level. A hard AGC signal in FIG. 3 shows an output signal of the monitoring photo-sensing element. The output signal level decreases in proportion to the stored charge amount from the start time of storage of the photo-sensor 1. By terminating the storage of the photo-sensor 1 when the signal level reaches the predetermined potential $V_{th}$, the output level of the photo-sensor 1 is at a proper level. Since the method for controlling the storage time IT by the hard AGC measure actual light intensity, it can provide more accurate storage control than the control by the soft AGC can, but since the monitoring area is fairly wide, it is the AGC control to the means value of the entire output and a portion of the signal may overflow even if the mean value is at the proper signal level for the object having a large contrast. Namely, the output signal of the photo-sensor 1 amplified by the predetermined gain overflows the input range. If the present potential $V_{th}$ of the hard AGC is raised in order to avoid the overflow, the output level of the photo-sensor 1 when the contrast of the object is low is too low.

Normally, the present potential $V_{th}$ of the hard AGC is set to a fairly low level and the storage time is normally controlled by the soft AGC, and in an abnormal case in which the brightness of the object abruptly increases, the storage is shut off by the hard AGC. That is, the charge storage is normally completed by the soft AGC before the hard AGC signal reaches the preset potential $V_{th}$.

A transfer signal in FIG. 3 functions to transfer the charges stored in the storage areas of the photo-diodes to a charge transfer area of the photo-sensor 1 at the end of the storage. The charges of the cells transferred to the transfer area are sequentially sent to the output area by a transfer clock and converted to a voltage by a capacitance of the output area. As shown by the output waveform of the photo-sensor 1 of FIG. 3, the output potential changes in accordance with the charges of the cells after vacant outputs (fine in FIG. 3) before the intended charge reaches the output area. The output of the photo-sensor 1 is A/D converted by the interface 3 as described above.

Figure 4:
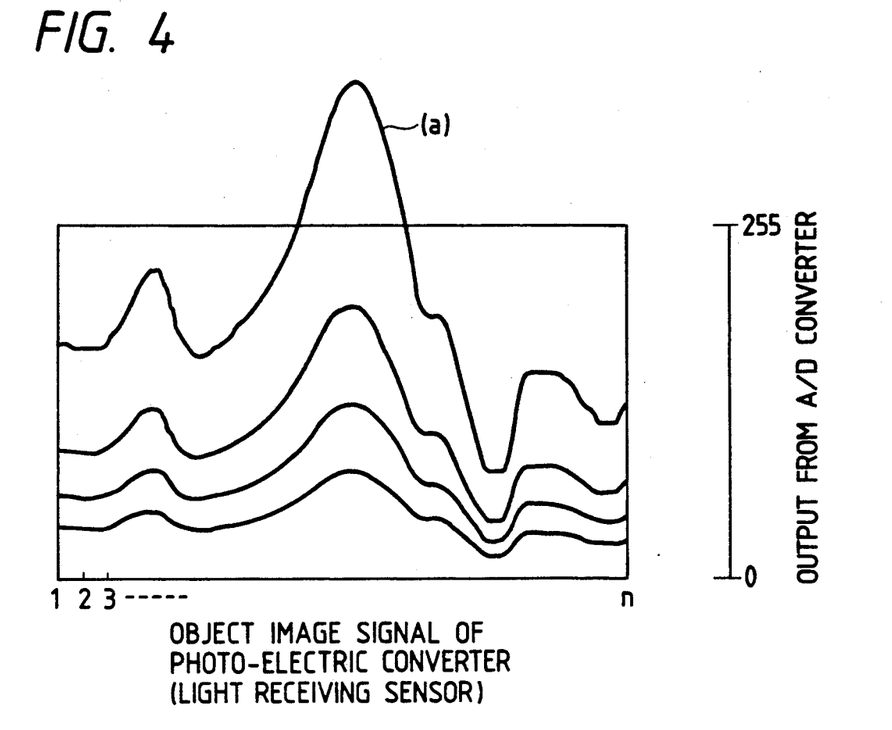
FIG. 4 shows an output waveform of an object image signal of the photo-sensor.

FIG. 4 shows a waveform of an object image signal which is derived by A/D converting the output of the photo-sensor 1 by the interface 3 when the light intensity of the same object changes. In a known phase comparison type focus detection system, two object image signals having a waveform as shown in FIG. 4 are derived from object images projected on at least one pair of photo-sensors. Only one of them is explained below.

When a portion of the object image signal overflows a maximum conversion value as shown by a waveform (a) in FIG. 4, the overflown data is converted to 255 and an error is included in the result of focus detection after the data processing. In order to secure the focus detection precision, it is desired that the object image signal from the interface 3 is large so long as it does not overflow the input voltage range of the A/D converter. By taking to overflow due to the change of the light intensity into consideration, a next storage time period is set to the storage time IT of the soft AGC so that a maximum value $D_{max}$ of the object image signal at the next storage time may become a predetermined target value Da, as shown in FIG. 5. A method for controlling the storage time so that the maximum value $D_{max}$ of the data is at a proper level is hereinafter called a peak AGC.

Figure 7:
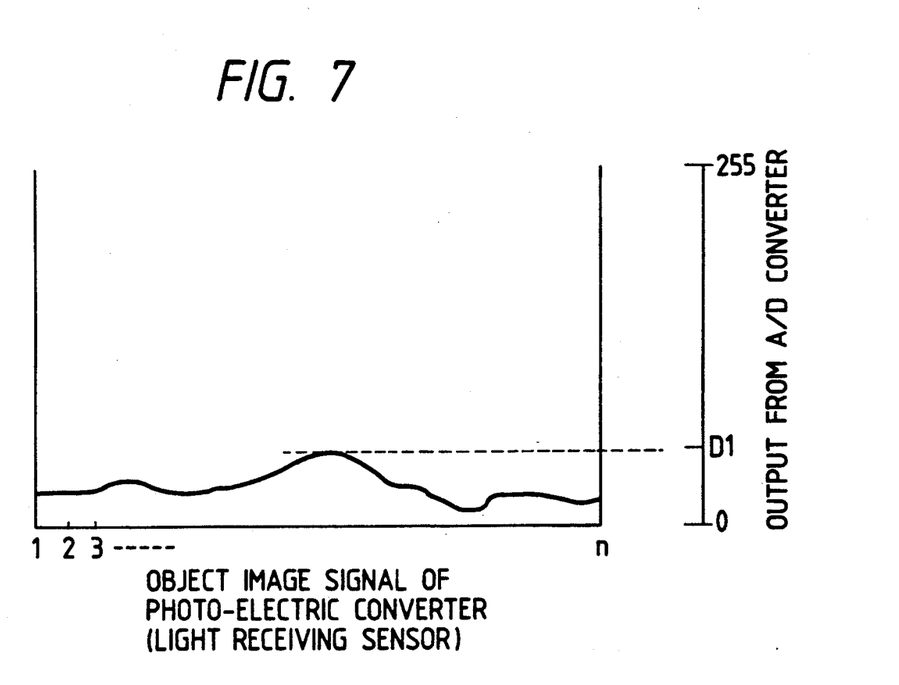
FIG. 7 shows an object image signal waveform having a low signal level as a whole.

If the charge storage by the soft AGC is effected several times when the object is still and there is no light intensity change, the output level of the photo-sensor 1 reaches a good output level as shown in FIG. 5. However, in actual, since the object moves, the photographer switches the object or the illumination changes, the output level of the photo-sensor 1 always varies even if the AGC works as shown in FIG. 4. Thus, before the data is processed in accordance with the A/D converted sensor output, whether a portion of data overflows as shown in FIG. 6 or not, or whether the level is too low as shown in FIG. 7 or not is checked. The necessary condition for the data used for the focus detection is, therefore, that the maximum value $D_{max}$ of the data does not overflow and larger than a predetermined minimum value D1 shown in FIG. 7. For example, if D1=50, the maximum value $D_{max}$ of the data is $$50 < D_{max} < 255$$

The data processed by hardware may saturate at a lower level than the maximum value of the A/D converter. In this case, the maximum value $D_{max}$ of the data is set to $$D_{max} < D_{sat}$$

where $D_{sat}$ is the saturation level.

Figure 8:
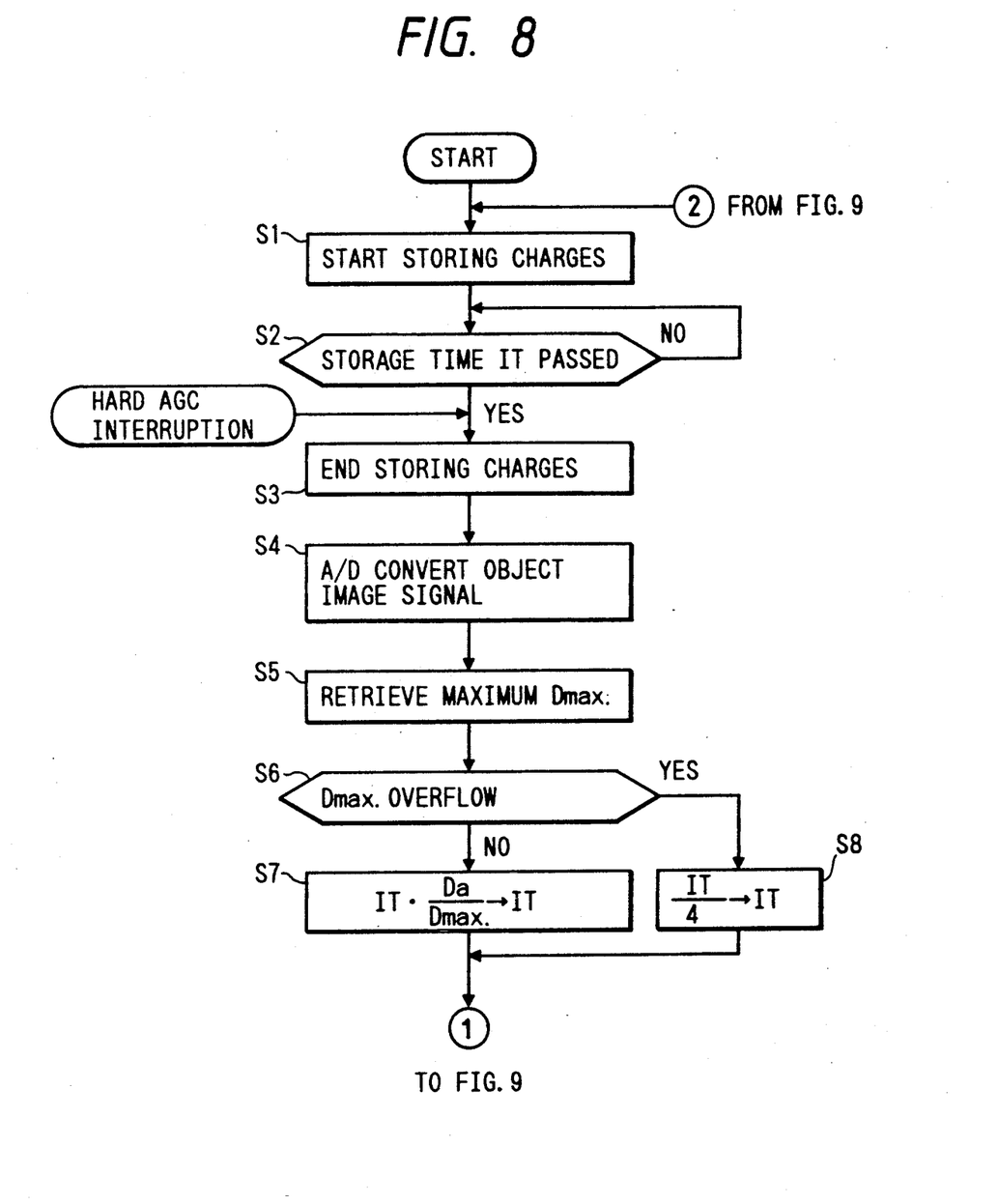
FIG. 8 shows a flow chart of a focusing control program executed by a microcomputer.

An operation of the auto-focusing apparatus is now explained with reference to flow charts of FIGS. 8 and 9.

In a step S1, the charge storage of the photo-sensor 1 is started. In a step S2, the elapse of the storage time IT calculated based on the data in the previous storage is monitored. When the object image changes and the light intensity increases over that in the previous storage, the output of the monitoring photo-sensing element reaches the preset potential $V_{th}$ before the storage time by the soft AGC elapses in the step S2 so that an interruption signal to the CPU 4 is generated. In any case, the charge storage is terminated in a step S3. In a step S4, the object image signal produced by the photo-sensor 1 is sequentially A/D converted as shown in FIG. 3 and they are stored in a memory in the CPU 4. In a step S5, the maximum value $D_{max}$ is searched from the data. In a step S6, whether the data maximum value $D_{max}$ overflows or not is determined. If it does not overflow, the process proceeds to a step S7 to calculate the next storage time T1 based on the maximum value $D_{max}$.

Since the output level of the photo-sensor is proportional to the storage time IT, the next storage time IT is determined by the following formula in accordance with a target control value Da of the maximum value $D_{max}$ and the current maximum value $D_{max}$.

(The next storage time TI of the soft AGC)=(the current storage time IT·$D_a/D_{max}$)

The storage time IT of the CPU 4 stored in the memory is updated by the calculated next storage time IT.

When the data maximum value $D_{max}$ overflows, the next storage time IT is set to, for example, ¼ of the current storage time in a step S8. Since it is not possible to determine the next storage time IT based on merely the overflown maximum value $D_{max}$, the storage time is temporarily shortened to ¼ by taking the response time into consideration. If the light intensity of the object abruptly increase so that all data of the object image overflow, the storage time may be shortened drastically to ⅛ for example. There may be a risk that the data of the next storage is too small but since the storage time itself is relatively short, a better responsibility in the focus detection is attained by the drastic reduction while taking the convergence in the next storage into consideration.

Figure 9:
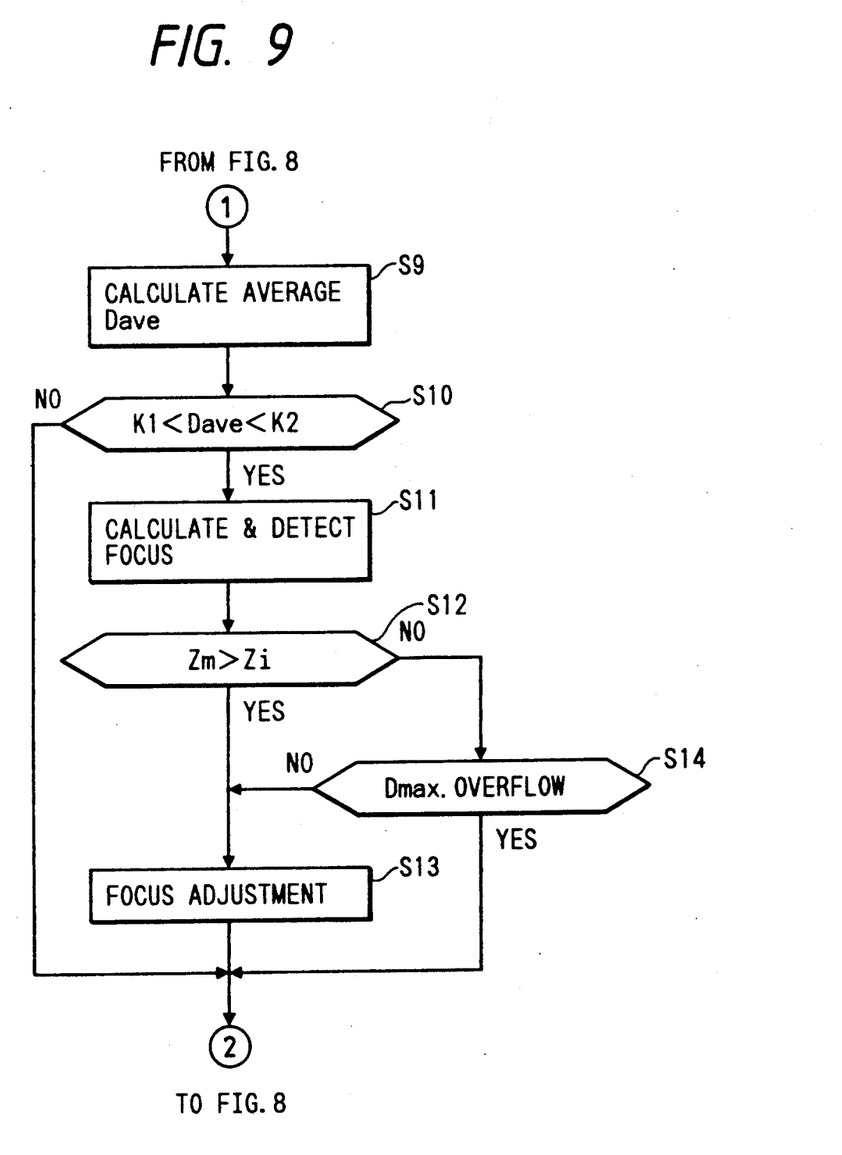
FIG. 9 shows a flow chart of a focusing program executed by the microcomputer.

In a step S9 of FIG. 9, a mean value $D_{ave}$ of the object image data is calculated by the following formula.

Total sum of data SUM=Σ (data)

Mean value $D_{ave}$=SUM/n where n is the total number of data.

In a step S10, whether the mean value $D_{ave}$ is larger than a minimum value K1 and smaller than a target value K2 or not is determined. If K1 $< D_{ave} <$ K2, the process proceeds to a step S11, and otherwise the process returns to the step S1 to start the next charge storage. The minimum value K1 and the target value K2 are predetermined by taking the reliability of the focus detection algorithm and the response of the auto-focusing apparatus into consideration. They may be determined as K1=D1 and K2=$D_a$.

In a step S11, the focus detection is performed by the predetermined algorithm in accordance with the object image signal to calculate a defocusing amount Zm. In a step S12, whether the defocusing amount is larger than a predetermined value Zi or not is determined. If Zm<Zi, the process proceeds to a step S13, and otherwise it proceeds to a step S14.

The value Zi is selected to enable the drive of the photographing lens 2 to the in-focus position by one-time drive. If the calculated defocusing amount Zm is smaller than Zi, the focusing is attained by driving the photographing lens 2 in accordance with the defocusing amount Zm, but if a portion of the object image data overflows, the calculated defocusing amount Zm includes an error and the photographing lens 2 cannot be precisely focused. Accordingly, when the focus adjustment is effected, the defocusing amount is again detected in the focus detection after the drive of the photographing lens 2 and further focus adjustment is needed. Since the two-times drive of the photographing lens 2 in the vicinity of the in-focus position impairs the operability, the focus adjustment is inhibited when $Zm \leq Zi$ and the portion of the object image data overflows, and the charge storage is effected again. On the other hand, if $Zm > Zi$, the photographing lens 2 cannot be brought to the in-focus position in one-time lens drive and hence the photographing lens 2 is driven in accordance with the defocusing amount Zm without regard to the overflow of the data.

In a step S13, the lens drive amount is determined in accordance with the defocusing amount Zm and the photographing lens 2 is driven through the driver 5. On the other hand, if the defocusing amount $Zm \leq Zi$, whether the maximum value $D_{max}$ of the object image signal data overflows or not is again determined in a step S14, and if it overflows, the process returns to the step S1 of FIG. 8 and otherwise it proceeds to the step S13.

In this manner, even if a portion of the object image data from the photo-sensor 1 overflows the input range of the A/D converter, the focus detection is performed in accordance with the object image data so long as the mean value of the object image data is within the predetermined range so that the focus adjustment is effected in accordance with the calculated defocusing amount Zm. Accordingly, the focus adjustment delay time from the start of charge storage to the start of drive of the photographing lens is shortened and the operability is improved.

Further, when a portion of the object image data overflows and the defocusing amount Zm calculated in accordance with such data is smaller than the predetermined value Zi, the drive of the photographing lens is inhibited. Thus, the two-times drive of the photographing lens in the vicinity of the in-focus position is prevented and the operating feeling is improved.

In the present embodiment, the auto-focusing apparatus which start the next focus detection after the completion of the lens drive in accordance with the result of the focus detection has been explained although the present invention is also applicable to an overlapped servo system auto-focusing apparatus which drives the lens during the charge storage and during the focus detection. In this case, the lens drive amount calculated in accordance with the result of the focus detection in the step S13 of FIG. 9 is updated and the photographing lens is driven during the charge storage and during the focus detection until the lens drive amount reaches zero. When the present invention is applied to the overlapped servo system auto-focusing apparatus, the level of the object image signal approaches a desired level for each focus detection even if the lens is driven based on the overflown object image data so long as the defocusing amount is larger than a certain amount. Accordingly, the delay time is shortened and the convergence of the servo system is improved.

In the present embodiment, the focus adjustment is effected when the mean value $D_{ave}$ of the data is smaller than the target value K2 and larger than the minimum value K1 even if a portion of the object image data overflows. Alternatively, the focus adjustment may be effected when the mean value $D_{ave}$ is smaller than the target value K2.

Further, in the present embodiment, the peak AGC process, the search of the maximum value $D_{max}$ of the data and the calculation of the mean value $D_{ave}$ are effected for all object image data (1~n), although the data area may be limited. When a high intensity light is present at an end of the focus detection area and the peak AGC is effected to all object image data of the area, the object image signal at the center of the area is suppressed to a low level and the focus detection error is large. In order to avoid this, the area for the peak AGC may be limited to a portion of the focus detection area as it has been done in the prior art. In this manner, the peak AGC process, the search of the maximum value $D_{max}$ of the data and the calculation of the mean value $D_{ave}$ may be limited to a portion of the focus detection area.

In the present embodiment, the photo-sensor 1 functions as photo-electric conversion means, the interface circuit 3 and the controller (CPU) 4 function as focus detection means, the driver 5 and the lens drive motor 5 function as drive means, and the controller (CPU) 4 functions as control means and averaging means.

In accordance with the present invention, the defocusing amount is calculated in accordance with the object image signals when the mean value of the object image signals of at least a portion of the photo-sensing elements is smaller than the first value even if a portion of the object image signals of the photo-sensing elements exceeds the proper input level of the focus detection means, and the photographing optical system is driven in accordance with the calculated defocusing amount. Accordingly, the delay time in the lens drive is shortened and the operability is improved.

In accordance with the embodiment of the present invention, when a portion of the object image signals of the photo-sensing elements exceeds the proper input level of the focus detection means, the drive of the photographing optical system is inhibited even if the mean value of the object image signals of at least a portion of the photo-sensing elements is smaller than the predetermined first value so long as the calculated defocusing amount is smaller than the predetermined second value. Accordingly, the two-times drive of the photographing optical system in the vicinity of the in-focus position is prevented and the operation feeling is improved.

When the present invention is applied to the overlapped servo system auto-focusing apparatus, the convergence of the overlapped servo drive of the photographing optical system is improved.

What is claimed is:

1. An auto-focusing apparatus comprising:
   photo-electric conversion means having a plurality of photo-sensing elements for sensing a light beam from an object directed through a focus detection optical system to produce object image signals representing light intensities of the photosensing elements;
   focus detection means for calculating a defocusing amount representing a focus adjustment status of a photographing optical system in accordance with the object image signals;
   drive means for driving said photographing optical system in accordance with the defocusing amount;
   control means for calculating the defocusing amount by said focus detection means in accordance with the object image signals when the object image signals of the photo-sensing elements are at a proper input level of said focus detection means to assure correct focus detection and driving said photographing optical system by said drive means in accordance with the calculated defocusing amount; and averaging means for calculating a mean value of the object image signals of at least a portion of the photo-sensitive elements, said control means calculating the defocusing amount by said focus detection means in accordance with the object image signals when the mean value calculated by said averaging means is smaller than a predetermined value even if a portion of the object image signals of the photo-sensing elements exceeds the proper input level of said focus detection means and driving said photographing optical system by said drive means in accordance with the calculated defocusing amount.

2. An auto-focusing apparatus according to claim 1 wherein said control means inhibits the drive of the photographing optical system in accordance with the defocusing amount when a portion of the object image signal of the photo-sensing elements exceeds the proper input level of said focus detection means and the defocusing amount calculated by said focus detection means is smaller than a predetermined value even if the mean value calculated by said averaging means is smaller than said predetermined value.

* * * * *